(12) United States Patent
Tabery et al.

(10) Patent No.: US 8,125,916 B2
(45) Date of Patent: Feb. 28, 2012

(54) METHOD OF TRANSMITTING SIGNALING MESSAGES

(75) Inventors: Peter Tabery, Munich (DE); Joerg Schaepperle, Stuttgart (DE)

(73) Assignee: Alcatel Lucent, Paris (FR)

( * ) Notice: Subject to any disclaimer, the term of this patent is extended or adjusted under 35 U.S.C. 154(b) by 734 days.

(21) Appl. No.: 12/117,983

(22) Filed: May 9, 2008

(65) Prior Publication Data

US 2009/0325568 A1 Dec. 31, 2009

(30) Foreign Application Priority Data

Jun. 21, 2007 (EP) .................................... 07290774

(51) Int. Cl.
*H04W 4/00* (2009.01)
*H04J 3/14* (2006.01)

(52) U.S. Cl. .......................... 370/252; 370/331; 370/350
(58) Field of Classification Search ......................... None
See application file for complete search history.

(56) References Cited

U.S. PATENT DOCUMENTS 5,408,514 A 4/1995 Sakamoto et al.
(Continued)

FOREIGN PATENT DOCUMENTS

DE 198 04 185 A1 8/1999
(Continued)

*Primary Examiner* — Chi Pham
*Assistant Examiner* — Soon-Dong Hyun
(74) *Attorney, Agent, or Firm* — Fay Sharpe LLP

(57) ABSTRACT

There is provided a method of transmitting signaling messages. In accordance with an embodiment of the invention, the method is performed by a first base station of a communication network. The first base station and the second base station of the communication network provide simultaneously a service to a terminal. The first base station transmits signaling messages relating to the provision of the service to the second base station via a relay component. The relay component is linked with the first base station and the second base station via radio links of the communication network. The relay component may be comprised in the terminal to which the service is provided or another terminal with corresponding functionality or a dedicated relay component of the communication network.

16 Claims, 3 Drawing Sheets

U.S. PATENT DOCUMENTS

| | | |
|---|---|---|
| 6,519,457 B1 | 2/2003 | Jiang et al. |
| 6,681,099 B1 * | 1/2004 | Keranen et al. ............ 455/67.16 |
| 7,113,782 B2 * | 9/2006 | Lucidarme ................. 455/432.1 |
| 7,203,499 B2 * | 4/2007 | Wigren ....................... 455/456.1 |
| 2004/0023650 A1 | 2/2004 | Ohta et al. |
| 2004/0106373 A1 * | 6/2004 | Shimada et al. ................... 455/9 |
| 2006/0009191 A1 * | 1/2006 | Malone, III ................ 455/404.1 |
| 2007/0253383 A1 * | 11/2007 | Yang .............................. 370/338 |
| 2008/0062906 A1 * | 3/2008 | Baker et al. .................... 370/315 |
| 2008/0171553 A1 * | 7/2008 | Ren et al. ....................... 455/450 |

FOREIGN PATENT DOCUMENTS

| | | |
|---|---|---|
| EP | 0866627 A | 9/1998 |
| WO | WO/99/40747 | 8/1999 |

* cited by examiner

METHOD OF TRANSMITTING SIGNALING MESSAGES

The invention is based on a priority application EP 07 290 774.4 which is hereby incorporated by reference.

TECHNICAL FIELD

The invention relates to a method of transmitting signaling messages in a communication network between base stations in general and to a method of transmitting signaling messages between base stations via radio links in particular.

BACKGROUND OF THE INVENTION

A terminal located in a cell of a cellular communication network is usually served by the base station of the communication network which provides radio coverage for this cell. There are however scenarios when a terminal is served by more than one base station. For example, the terminal being located in a cell of the network and served by a first base station might be handed over in a so called soft handover to a second base station which provides radio coverage to the neighboring cell. During the soft handover, the terminal is served by the first and by the second base station simultaneously. Datagrams which are to be sent to the terminal are duplicated and sent by the first base station as well as by the second base station to the terminal during the soft handover. However, the datagrams sent via the first and second base station have to be synchronized as it must be guaranteed that both base stations send the identical datagrams in the identical order with identical link layer headers at the same time. It may also be required to synchronize the physical layer signals in order to increase capacity or reliability by using radio links to more than one base station. In order to, but not exclusively, organize the synchronization of the transmissions by the two base stations, the two base stations exchange signaling messages via the fixed network's infrastructure, e.g. via the backhaul network. The round trip time of a signaling message relates to the time it takes to transfer a signaling message from the first base station to the second base station and to receive a response at the first base station might however be quite long as the two base stations might be far apart with respect to the fixed network's topology. A long round trip time for the exchange of signaling messages might lead to delays in the simultaneous delivery of the datagrams to the mobile terminal and might therefore negatively affect time critical applications running on the mobile terminal that make use of the datagrams.

There is therefore a need for an improved method of transmitting signaling messages in a communication network. Accordingly, there is a need for an improved base station and terminal for realizing the method proposed herein.

SUMMARY OF THE INVENTION

According to a first aspect of the invention, there is provided a method of transmitting signaling messages. In accordance with an embodiment of the invention, the method is performed by a first base station of a communication network. According to a step of the method, the first base station provides a service to a terminal. The service is further provided to the terminal by at least a second base station of the communication network. In a further step, signaling messages that relate to the service are transmitted from the first base station to the second base station via a relay component which is linked with the first base station and the second base station via radio links of the communication network. The relay component may be comprised in the terminal to which the service is provided or another terminal with corresponding functionality or a dedicated relay component of the communication network.

Instead of sending the signaling messages from the first base station over the network's fixed infrastructure, e.g. over the backhaul network, to the second base station, the signaling messages are sent via a radio link of the communication network to a relay component from where they are further transmitted to the second base station. This provides the advantage that the signaling messages arrive quicker at the second base station than via the network's fixed infrastructure, especially when the second base station is far apart from the first base station with respect to the network's topology.

In accordance with an embodiment of the invention, the first base station receives responses to the signaling messages from the second base station via the relay component. A response might be a further signaling message sent in response to the reception of a signaling message from the second base station via the relay component to the first base station or might be an acknowledge message. Thus, signaling messages are exchanged between the two base stations over the relay component. Hence, the round trip time of a signaling message might be much lower than the round trip time of a signaling message which is sent over the fixed network's infrastructure. This allows better synchronization of physical layer signals, scheduling mechanisms and datagram transmission. The service with respect to which the signaling messages are exchanged can then be provided with less delay and higher throughput and/or reliability to the terminal by both base stations. Hence, time critical applications running on the terminal and which make use of the service are improved.

In accordance with an embodiment of the invention, the first base station determines a first roundtrip time for a signaling message. The first roundtrip time corresponds to the time period required to transmit the signaling message from the first base station to the second base station via the relay component and to receive a response from the second base station at the first base station. Furthermore, the first base station determines a second roundtrip time for the signaling message. The second roundtrip time corresponds to the time period required to transmit the signaling message from the first base station to the second base station via a fixed (wired or wireless) communication path of the communication network. The fixed communication path thereby relates to the communication links (e.g., radio links, fiber links, copper links) provided by the fixed network's infrastructure as for example by the backhaul or backbone network of the communication network. The signaling messages are transmitted to the second base station via the relay component, if the first roundtrip time is shorter than the second roundtrip time, and otherwise the signaling messages are transmitted to the second base station via the fixed communication path. The fixed communication path relates to a path between the first and second base station provided, for example, by the backhaul network.

In accordance with an embodiment of the invention, the first base station signals to the second base station that the signaling messages are to be exchanged between both base stations via the relay component or via a fixed communication path. The first base station signals for example to the second base station that signaling messages are to be sent over the relay component if the first roundtrip time is shorter than the second round trip time. This way, the second base station is instructed to send responses via the relay component, too.

In accordance with an embodiment of the invention, the signaling messages sent by the first base station to the second base station are cryptographically secured. Further, the responses received by the first base station from the second base station are cryptographically secured, either by encrypting the entire signaling messages and responses or by attaching a cryptographic signature to them. This provides the advantage that the relay component over which the signaling messages and the responses are sent is not able to manipulate the signaling messages. The first base station might for example employ encryption means to encrypt the signaling messages before transmission, while the second base station employs decryption means to decrypt the encrypted signaling messages. Similarly the second base station employs encryption means to encrypt the responses, whereas the first base station employs decryption means to decipher the responses.

In accordance with an embodiment of the invention, the first and second base stations provide the service to the terminal while the terminal is handed over according to a soft handover from the first base station to the second base station. As has been elucidated in the background section, two base station serve simultaneously a terminal during a soft handover. The method in accordance with the invention is particularly advantageous when performed during a soft handover as the delay on services to be delivered to the terminal during the handover can be reduced, maybe even drastically.

In accordance with an embodiment of the invention, the service is provided simultaneously to the terminal by at least the first and the second base station during a so called simulcast. During a simulcast, several base stations that provide overlapping radio coverage to adjacent cells of a communication network serve simultaneously a terminal located in one of these cells. Thus, in a simulcast scenario, the terminal is located in a cell for which the first and second base stations provide radio coverage. Both base stations hold an active connection with the terminal and provide the same service to the terminal during the simulcast. The term service is used within the scope of this document in the widest sense, meaning that the base stations hold at least an active connection with the terminal. The provision of the service must however be synchronized between the base stations. According to the method in accordance with the invention, the first and second base station serving the terminal in a simulcast employ the relay component located in one of the cells for exchanging the signaling messages. A delay which might occur with respect to the provision of the service can therefore be kept relatively small.

In accordance with an embodiment of the invention, the signaling messages and the responses relate to scheduling messages exchanged between the first and second base station. A scheduling message is exchanged with respect to a datagram or a burst of datagrams. The datagram or the burst of datagrams are simultaneously transmitted by the first and second base station to the terminal. A scheduling message is employed to synchronize the transmission of a datagram or a burst of datagrams between the first base station and the second base station.

During a soft handover or during a simulcast, datagrams or burst of datagrams might have to be delivered with respect to the service to the terminal in a synchronized way by both base stations. From a network perspective, the datagrams must be dispatched to all base stations involved in the soft handover or in the simulcast. The base stations must then synchronize the transfer of the datagrams to the terminal and must therefore agree on a common time and radio resource for transmitting a particular datagram or a burst of datagrams. From the terminal's perspective, the simulcast may not be different from regular multipath propagation. There are therefore no modifications required at the terminal. However it has to be guaranteed that all base stations transmit with sufficient accuracy the identical datagrams or burst of datagrams in an identical order with identical link layer headers at the same time.

In accordance with an embodiment of the invention, the relay component is comprised in the terminal or in another terminal served by the first base station and the second base station. The signaling messages can therefore be exchanged between the first base station and the second base station via the terminal that is served by both base stations or via another terminal which is served by both base stations.

In accordance with an embodiment of the invention, the terminal is a mobile terminal such as a mobile phone, a personal digital assistant (PDA), a laptop, or any other portable device being connectable to a communication network.

In accordance with an embodiment of the invention, the communication network is a cellular communication network. In particular, the communication network is a Wimax network, a WLAN network, a GSM network, or a UMTS network.

According to a second aspect of the invention, there is provided a computer program product with computer executable instructions, wherein the computer program product is storable on a storage media, and wherein the instructions are adapted to perform steps of the method in accordance with the invention.

According to a third aspect, there is provided a base station. The base station relates to a first base station in a communication network, and the base station comprises means for providing a service to a terminal and means for transmitting signaling messages to a second base station providing the service to the terminal, wherein the signaling messages are transmitted via a relay component to the second base station, wherein the signaling messages relate to the service, and wherein the relay component is adapted to be linked to the first base station and the second base station via radio links of the communication network.

According to a fourth aspect of the invention, there is provided a relay component for a communication network. The relay component is adapted to communicate with the first base station and the second base station of the communication network simultaneously or quasi-simultaneously via radio links of the communication network. The relay component has further means for receiving signaling messages from the first base station and from the second base station, wherein the first base station and the second base station are adapted to simultaneously provide a service to a terminal, and wherein the signaling messages relate to the service. The relay component has further means for forwarding the signaling messages received from the first base station to the second base station and for forwarding the signaling messages (corresponding to the responses) received from the second base station to the first base station.

BRIEF DESCRIPTION OF THE DRAWINGS

In the following embodiments of the invention will be described in greater detail by making reference to the drawings in which.

DETAILED DESCRIPTION OF PREFERRED EMBODIMENTS

Figure 1:
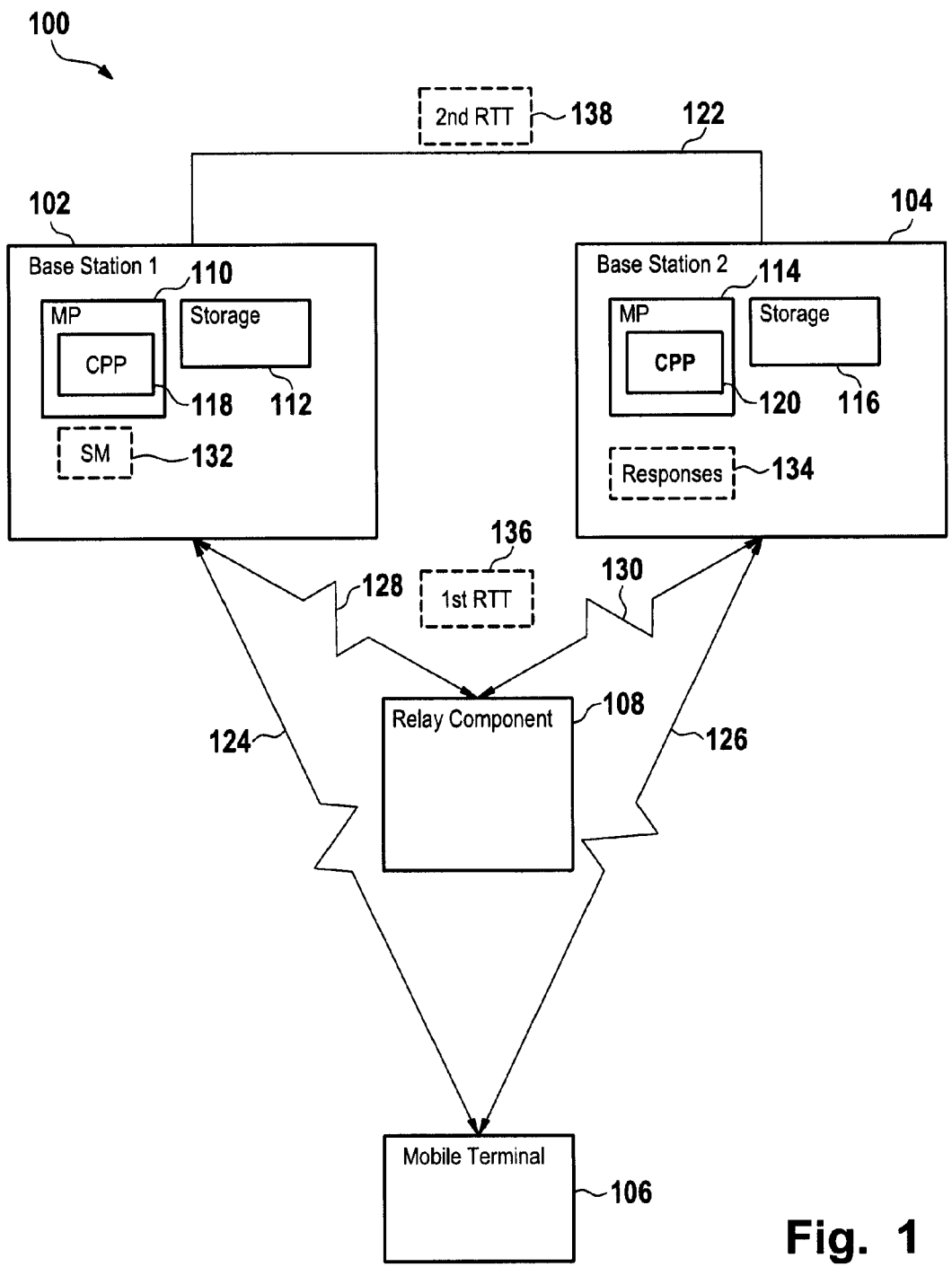
FIG. 1 shows schematically a block diagram of a communication network.

FIG. 1 shows schematically a block diagram of a communication network 100. The communication network 100 comprises a first base station 102 and a second base station 104. The first base station 102 comprises a microprocessor 110, and a storage 112. Similarly, the second base station 104 comprises a microprocessor 114, and a storage 116. The microprocessor 110 executes a computer program product 118 which is for example permanently stored on the storage 112 and loaded for execution into the microprocessor 110. Similarly, the microprocessor 114 of the second base station 104 executes a computer program product 120 which is permanently stored on the storage 116 and loaded for execution into the microprocessor 114.

The first base station 102 is connected via a wired communication path 122, e.g. a communication path provided by the backhaul network, with the second base station 104. Further, the first base station 102 holds an active connection over communication link 124 with the mobile terminal 106. The second base station 104 has established an active connection over communication link 126 with the mobile terminal 106. The communication links 124 and 126 are radio communication links of the network 100. That is, the mobile terminal 106 is connected with the first and second base station, respectively, via wireless network connections. The first base station 102 as well as the second base station 104 serve the mobile terminal 106 simultaneously via the communication link 124 and 126, respectively. Thus, the first base station 102 as well as the second base station 104 provide simultaneously a service to the mobile terminal 106.

In order to synchronize the provision of the service between the first and second base stations 102 and 104, the computer program product 118 initiates the transmission of signaling messages 132 relating to the service to the second base station via a relay component 108. That is, a communication link 128 is established between the base station 102 and the relay component 108 and a communication link 130 is established between the relay component 108 and the second base station 104. The communication links 128, 130 are also radio links of the communication network. The signaling messages 132 are passed from the base station 102 to the relay component 108, from where the signaling messages 132 are further transmitted to the second base station 104. In response to the reception of the signaling messages 132, the computer program product 120 of the base station 104 initiates the transmission of responses 134 over the communication link 130 to the relay component 108 from where they are further transmitted via the communication link 128 to the first base station 102.

The first base station 102 can also send the signaling messages 132 over the communication path 122. According to an embodiment of the invention, the first base station 102 determines before the transmission of the signaling messages 132 which transmission path is better suited for the transmission of the signaling messages 132 and for the reception of the responses 134.

The computer program product 118 therefore initiates the determination of a first roundtrip time 136 for a signaling message. The first roundtrip time 136 thereby corresponds to the time period required to transmit a signaling message from the first base station to the second base station 104 via the relay component 108 and to receive a response from the second base station 104 at the first base station 102 via the relay component 108.

Similarly, the computer program product 118 initiates the determination of a second roundtrip time 138 which corresponds to the time period required to transmit the signaling message from the first base station to the second base station via the communication path 122 and to receive a response from the second base station 104 at the first base station 102 via the communication path 122.

The computer program product 118 compares then the first roundtrip time 136 with the second roundtrip time 138, and only if the first roundtrip time 136 is shorter than the second roundtrip time 138, the signaling messages 132 are sent via the relay component 108 to the second base station 104. Correspondingly, only if this is the case, the computer program product 120 initiates the sending of the responses 134 via the relay component 108 to the first base station 102. Otherwise the signaling messages 132 and the responses 134 are exchanged via the communication path 122.

The method in accordance with the invention is therefore particularly advantageous as the optimal transmission path for the exchange of signaling messages between two base stations serving a mobile terminal is selected, wherein the transmission path can be a wireless transmission path over a relay component 108 as well as a wired transmission path, e.g., over the backhaul or aggregation network.

The relay component 108 can be a separate component of the network 100. The relay component is then adapted to communicate with base stations of the network, such as the first and second base station 102 and 104, via radio communication links, such as the radio communication links 128 and 130. The functionality of the relay component 108 can furthermore be directly implemented into the mobile terminal 106. Then, the links 124 and 128, as well as 126 and 130, respectively, would be identical.

Figure 2:
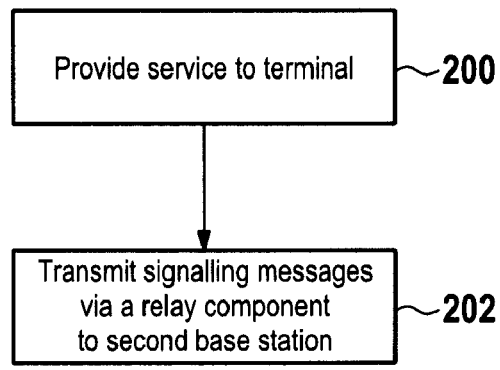
FIG. 2 shows a flow diagram illustrating steps of a method according to the invention.

FIG. 2 shows schematically a flow diagram illustrating steps of a method according to the invention. The method is performed by a first base station of a communication network. According to step 200 of the method, the first base station provides a service to a terminal, wherein the service is further provided simultaneously to the terminal by at least a second base station of the communication network. According to step 202 of the method, the first base station furthermore transmits signaling messages to the second base station via a relay component. The signaling messages relate to the service and the relay component is linked with the first base station and the second base station via radio links of the communication network.

Figure 3:
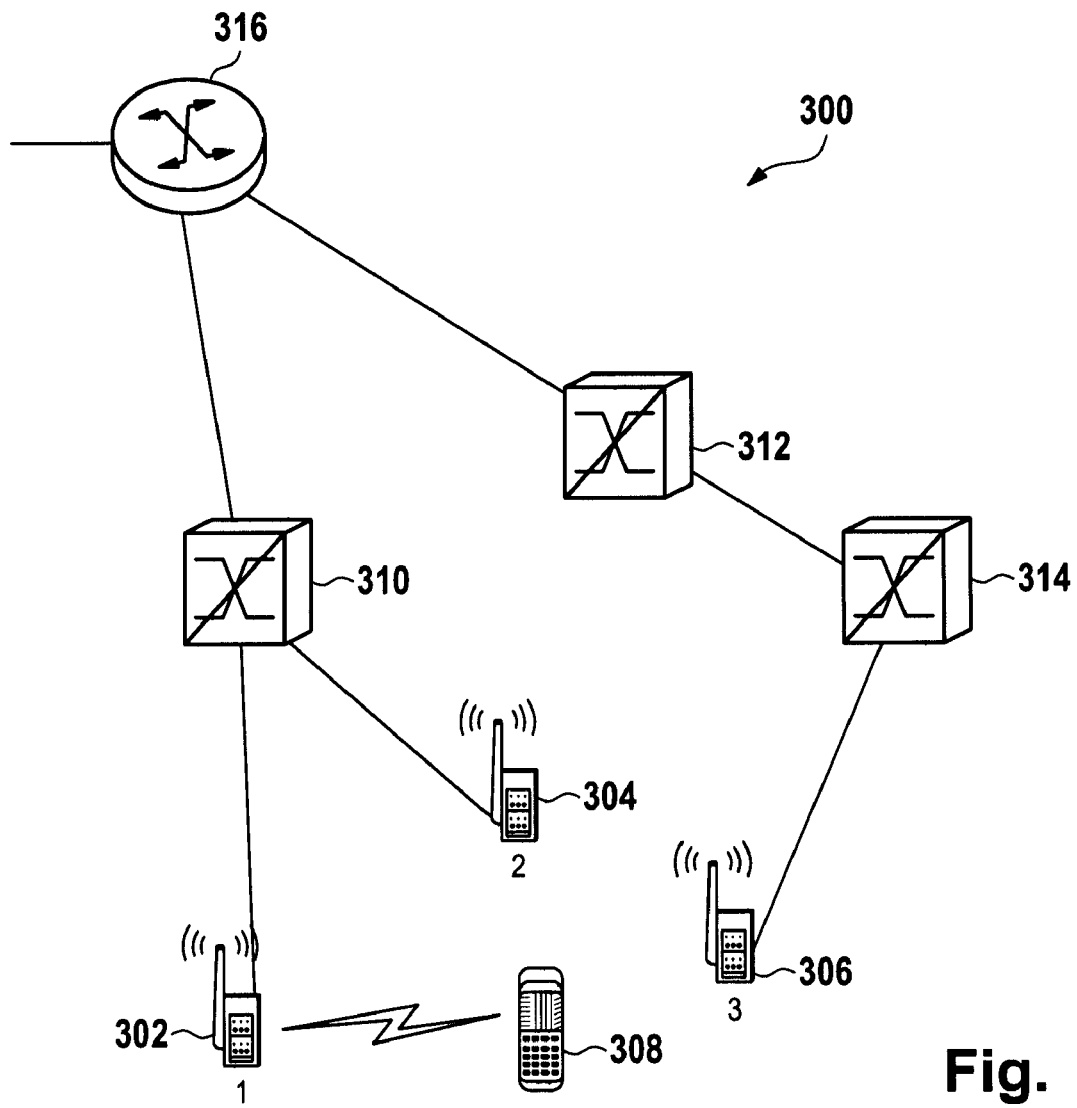
FIG. 3 shows schematically a block diagram of a communication network.

FIG. 3 shows schematically a block diagram of a communication network 300. The communication network 300 comprises base station 1 302, base station 2 304, and base station 3 306. The network 300 further comprises a mobile terminal 308 and intermediate network nodes 310, 312, and 314. Furthermore, the network 300 has a core network component 316.

The intermediate network node 310 connects to the base stations 302 and 304. There is therefore a path between the base station 302 and base station 304 via the intermediate network node 310. The intermediate network node 314 connects to the base station 306. According to the example shown here, the base station 1 302 and correspondingly the base station 2 304 are connected with the base station 3 306 only via the intermediate network node 310, via the component in the core network 316, via the intermediate network node 312, and via the intermediate network node 314.

The base stations 302, 304, and 306 might provide a service to the mobile terminal 308 simultaneously, for example, according to the simulcast scenario described before. The service provided simultaneously by the three base stations 302, 304, and 306 must be synchronized. For this, the base stations 302, 304, and 306 exchange signaling messages. The signaling messages can be exchanged via the fixed network path or alternatively via wireless network links over a relay component integrated into the mobile terminal 308.

Before the base station 1 302 starts sending signaling messages to the base station 2 304, the base station 1 302 determines a first roundtrip time for a signaling message. The first roundtrip time corresponds to the period of time required for sending a signaling message from the base station 1 302 via the mobile terminal 308 to the base station 2 304 plus the time it takes for the response of the base station 2 304 to arrive via the terminal 308 at the base station 1 302.

Furthermore, the base station 1 302 determines a second roundtrip time for a signaling message. The second roundtrip time relates to the period of time it takes for a signaling message to arrive at the base station 2 304, when the signaling message is sent via the intermediate network node 310 plus the time is takes for the response to arrive via the intermediate network node 310 at the base station 1 302. If the first roundtrip time is shorter than the second roundtrip time, the signaling messages are then sent from the base station 1 302 via the terminal 308 to the base station 2 304, otherwise via the intermediate network node 310. As the base stations 302 and 304 are interconnected by only one node, the intermediate network node 310, the second roundtrip time is probably shorter than the first roundtrip time and hence the signaling messages will be exchanged via the intermediate network node 310.

The situation might however be different when the signaling messages are exchanged between the base station 1 302 and the base station 3 306. There, a signaling message sent over the fixed network path passes through the intermediate network node 310, through the component 316, through the intermediate network node 312, and through the intermediate network node 314 until the signaling message arrives at the base station 3 306. The same holds for the response sent from the base station 3 306 to the base station 1 302. Hence, the roundtrip time of a signaling message over the fixed network path might be very long in comparison to the roundtrip time of a signaling message exchanged between the base station 1 302 and the base station 3 306 over the terminal 308.

Thus, further signaling messages exchanged via the base station 1 302 and base station 3 306 relating to the service provided by the base stations 302, 304, and 306 to the terminal 308 are exchanged between the base station 1 302 and base station 2 304 via the wired network connections, that is via intermediate network node 310, between base stations 302 and 306 via the mobile terminal 308 and between the base stations 304 and 306 via the mobile terminal 308. This ensures that the delay caused by the exchange of signaling messages with respect to the service provided to the terminal 308 by the three base stations is kept as low as possible.

Figure 4:
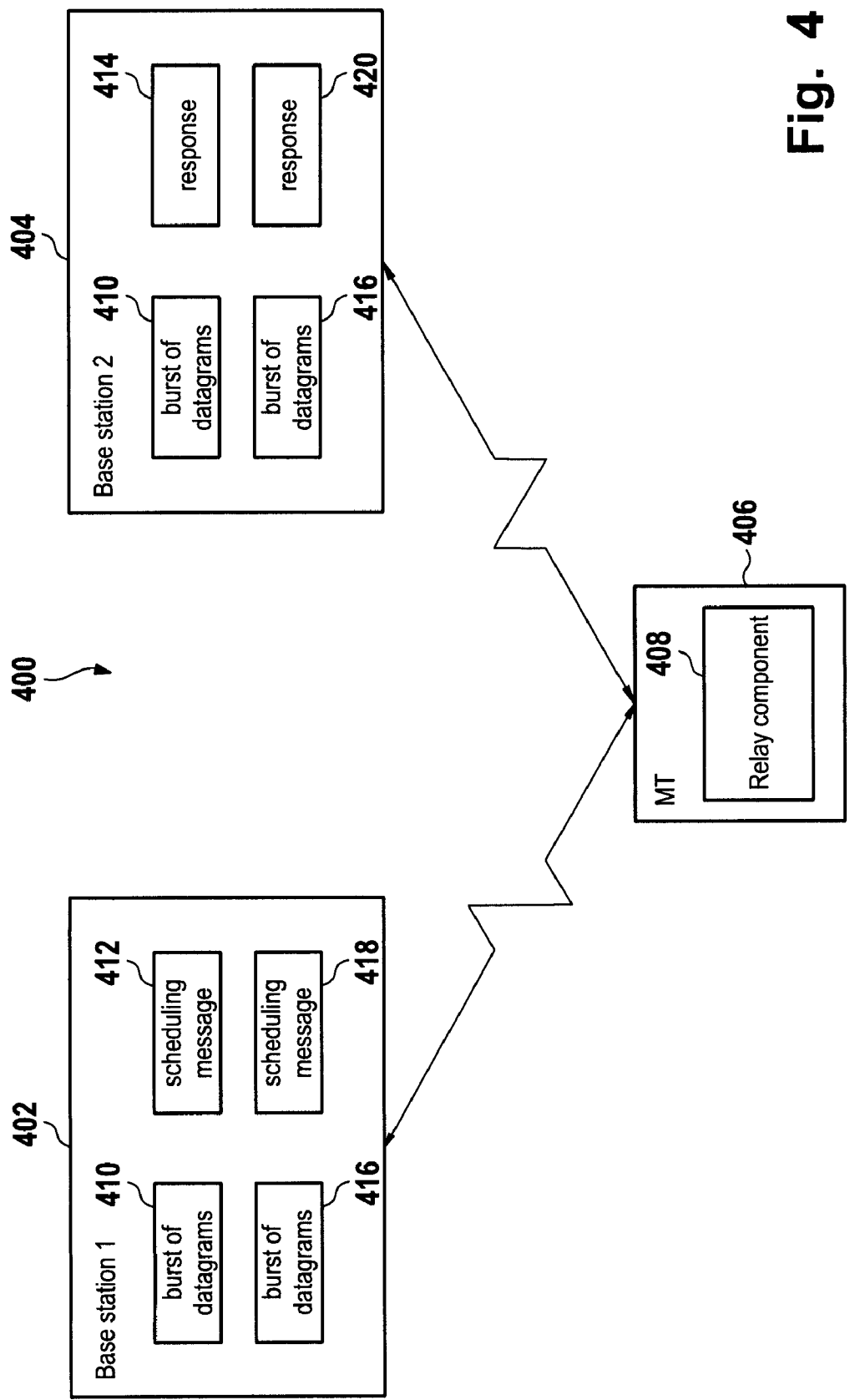
FIG. 4 shows schematically a block diagram of a network comprising a first and second base station serving simultaneously a mobile terminal.

FIG. 4 shows schematically a block diagram of a network 400 comprising a first base station 402 and a second base station 404, whereby both base stations serve simultaneously a mobile terminal 406. The mobile terminal 406 comprises a relay component 408.

The base stations 402 and 404 shall for example transmit simultaneously a sequence of burst of datagrams comprising burst of datagrams 410 and 416 to the mobile terminal 408. For this, the burst of datagrams 410 and 416 are duplicated so that they are available to the first and the second base 402 and 404 as shown in FIG. 4. However, the transmission of each burst of datagram has to be synchronized between the two base stations 402 and 404. Thus, before the first base station 402 sends the burst of datagrams 410 to the terminal 406, it sends a scheduling message 412 via the relay component 408 to the second base station 404 in order to schedule the transmission of the burst of datagrams 410 with the second base station 404. The second base station 404 sends a corresponding response 414 via the relay component 408. After reception of the response 414 by the first base station, both base stations transmit the burst of datagrams 410 in a synchronized way to the terminal 406.

Similarly, before the first base station 402 sends the burst of datagrams 416 to the terminal 406, it sends a scheduling message 418 via the relay component 408 to the second base station 404 in order to schedule the transmission of the burst of datagrams 416 with the second base station 404. The second base station 404 sends a corresponding response 420 via the relay component 406. After reception of the response 420 by the first base station, both base stations transmit the burst of datagrams 416 in a synchronized way to the terminal 406.

List of Reference Numerals

100 Network
102 Base station
104 Base station
106 Mobile terminal
108 Relay component
110 Microprocessor
112 Storage
114 Microprocessor
116 Storage
118 Computer program product
120 Computer program product
122 Communication path
124 Communication link
126 Communication link
128 Communication link
130 Communication link
132 Signaling messages
134 Responses
136 First roundtrip time
138 Second roundtrip time
300 Network
302 Base station
304 Base station
306 Base station
308 Mobile terminal
310 Intermediate network node
312 Intermediate network node
314 Intermediate network node
316 Core network component
400 Network
402 Base station
404 Base station
406 Terminal
408 Relay component
410 Burst of datagrams
412 Scheduling message
414 Response
416 Burst of datagrams
418 Scheduling message
420 Response

The invention claimed is:

1. A method of transmitting signaling messages, the method being performed by a first base station of a communication network, the method comprising:

providing a service to a terminal, the service being further provided to the terminal by at least a second base station of the communication network, determining a first roundtrip time for a signaling message, the first roundtrip time corresponding to a first time period required to transmit a signaling message from the first base station to the second base station via the relay component and to receive a response from the second base station via the relay component at the first base station, the relay component being linked through a radio link of the communication network with the first base station and through a radio link of the communication network with the second base station;

determining a second roundtrip time for the signaling message, the second roundtrip time corresponding to a second time period required to transmit the signaling message from the first base station to the second base station via a fixed communication path of the communication network, and to receive the response from the second base station at the first base station via the fixed communication path; and transmitting signaling messages relating to the service to the second base station via the relay component, if the first roundtrip time is shorter than the second roundtrip time, and otherwise transmitting the signaling messages to the second base station via the fixed communication path.

2. The method according to claim 1, further comprising receiving responses to the signaling messages from the second base station, wherein the responses are sent via the radio links of the communication network and the relay component from the second base station to the first base station.

3. The method according to claim 2, further comprising employing encryption means to encrypt the signaling messages before transmission or to cryptographically sign the signaling messages, and employing decryption means to decrypt the responses after reception.

4. The method according to claim 2, wherein the signaling messages and the responses relate to scheduling messages exchanged between the first and second base station, wherein a scheduling message is exchanged with respect to a datagram or a burst of datagrams, wherein the datagram or the burst of datagrams are to be simultaneously transmitted by the first and second base stations to the terminal, wherein the scheduling message is employed to synchronize the transmission of the datagram or the burst of datagrams between the first base station and the second base station.

5. The method according to claim 1, wherein the relay component is comprised in the terminal or in another terminal serviced by the first base station and the second base station.

6. A non-transitory computer program product comprising computer executable instructions, the instructions perform steps of the method according to claim 1.

7. A base station, the base station relating to a first base station, the first base station comprising:
means for providing a service to a terminal, the service being further provided to the terminal by at least a second base station of the communication network;
means for determining a first roundtrip time for a signaling message, the first roundtrip time corresponding to a first time period required to transmit a signaling message from the first base station to a second base station via a relay component and to receive a response from the second base station via the relay component at the first base station;
means for determining a second roundtrip time for the signaling message, the second roundtrip time corresponding to a second time period required to transmit the signaling message from the first base station to the second base station via a fixed communication path of the communication network and to receive the response from the second base station at the first base station via the fixed communication path, wherein the relay component is linked via radio links with the first base station and the second base station, wherein the second base station provides the service simultaneously with the first base station to the terminal; and
means for transmitting the signaling messages relating to the service to the second base station via the relay component, if the first roundtrip time is shorter than the second roundtrip time, and otherwise transmitting the signaling messages to the second base station via the fixed communication path.

8. A relay component or a communication network, the relay component comprising:
means for communication with a first base station and a second base station of the communication network via radio links of the communication network;
means for receiving signaling messages from the first base station, the first base station and the second base station simultaneously provides a service to a terminal, wherein the signaling messages relate to the service, wherein the first base station determines a first roundtrip time for a signaling message, the first roundtrip time corresponding to the time period required to transmit a signaling message from the first base station to the second base station via the relay component and to receive a response from the second base station via the relay component at the first base station;
means for forwarding the signaling messages to the second base station,
means for receiving responses with respect to the signaling messages from the second base station, wherein the first base station further determines a second roundtrip time for the signaling message, the second roundtrip time corresponding to the time period required to transmit the signaling message from the first base station to the second base station via a fixed communication path of the communication network, and to receive the response from the second base station at the first base station via the fixed communication path;
means for forwarding the responses to the first base station if the first roundtrip time is shorter than the second roundtrip time.

9. A communication network comprising a first base station, the first base station comprising:
means for providing a service to a terminal, the service being further provided to the terminal by at least a second base station of the communication network;
means for determining a first roundtrip time for a signaling message, the first roundtrip time corresponding to a first time period required to transmit a signaling message from the first base station to a second base station via a relay component and to receive a response from the second base station via the relay component at the first base station;
means for determining a second roundtrip time for the signaling message, the second roundtrip time corresponding to a second time period required to transmit the signaling message from the first base station to the second base station via a fixed communication path of the communication network, and to receive the response from the second base station at the first base station via the fixed communication path; and
means for transmitting signaling messages relating to the service to the second base station via the relay component, if the first time period is shorter than the second time period, and otherwise transmitting the signaling messages to the second base station via the fixed communication path.

10. A method of transmitting signaling messages, the method being performed by a first base station of a communication network, the method comprising:
providing a service to a terminal, the service being further provided to the terminal by at least a second base station of the communication network;
transmitting the signaling messages to the second base station via a relay component, the signaling messages relating to the provision of the service to the terminal, the relay component being linked through a radio link of the communication network with the first base station and through a radio link of the communication network with the second base station; and
receiving responses to the signaling messages from the second base station, wherein the responses are sent via the radio links of the communication network and the relay component from the second base station to the first base station, wherein the signaling messages and the responses relate to scheduling messages exchanged between the first and second base station, wherein a scheduling message is exchanged with respect to a datagram or a burst of datagrams, wherein the datagram or the burst of datagrams are to be simultaneously transmitted by the first and second base stations to the terminal, and wherein the scheduling message is employed to synchronize the transmission of the datagram or the burst of datagrams between the first base station and the second base station.

11. The method according to claim 10, further comprising employing encryption means to encrypt the signaling messages before transmission or to cryptographically sign the signaling messages, and employing decryption means to decrypt the responses after reception.

12. The method according to claim 10, wherein the relay component is comprised in the terminal or in another terminal serviced by the first base station and the second base station.

13. A non-transitory computer program product comprising computer executable instructions, the instructions perform steps of the method according to claim 10.

14. A base station, the base station relating to a first base station, the first base station comprising:
means for providing a service to a terminal;
means for transmitting signaling messages to a second base station via a relay component, wherein the signaling messages relate to the service, wherein the relay component is linked via radio links with the first base station and the second base station, wherein the second base station provides the service simultaneously with the first base station to the terminal; and
means for receiving responses to the signaling messages from the second base station, wherein the responses are sent via the radio links of the communication network and the relay component from the second base station to the first base station, wherein the signaling messages and the responses relate to scheduling messages exchanged between the first and second base station, wherein a scheduling message is exchanged with respect to a datagram or a burst of datagrams, wherein the datagram or the burst of datagrams are to be simultaneously transmitted by the first and second base stations to the terminal, and wherein the scheduling message is employed to synchronize the transmission of the datagram or the burst of datagrams between the first base station and the second base station.

15. A relay component for a communication network, the relay component comprising:
means for communication with a first base station and a second base station of the communication network via radio links of the communication network;
means for receiving signaling messages from the first base station, the first base station and the second base station simultaneously provides a service to a terminal, wherein the signaling messages relate to the service;
means for forwarding the signaling messages to the second base station,
means for receiving responses with respect to the signaling messages from the second base station;
means for forwarding the responses to the first base station; and
means for receiving responses to the signaling messages from the second base station, wherein the responses are sent via the radio links of the communication network and the relay component from the second base station to the first base station, wherein the signaling messages and the responses relate to scheduling messages exchanged between the first and second base station, wherein a scheduling message is exchanged with respect to a datagram or a burst of datagrams, wherein the datagram or the burst of datagrams are to be simultaneously transmitted by the first and second base stations to the terminal, and wherein the scheduling message is employed to synchronize the transmission of the datagram or the burst of datagrams between the first base station and the second base station.

16. A communication network comprising a first base station, the first base station comprising:
means for providing a service to a terminal;
means for transmitting signaling messages relating to the service to the second base station via the relay component, if the first time period is shorter than the second time period, and otherwise transmitting the signaling messages to the second base station via the fixed communication path; and
means for receiving responses to the signaling messages from the second base station, wherein the responses are sent via the radio links of the communication network and the relay component from the second base station to the first base station, wherein the signaling messages and the responses relate to scheduling messages exchanged between the first and second base station, wherein a scheduling message is exchanged with respect to a datagram or a burst of datagrams, wherein the datagram or the burst of datagrams are to be simultaneously transmitted by the first and second base stations to the terminal, and wherein the scheduling message is employed to synchronize the transmission of the datagram or the burst of datagrams between the first base station and the second base station.

* * * * *